March 29, 1932. U. G. TODD 1,851,266
METHOD FOR TREATING SUBSTANCES
Filed Aug. 6, 1928   6 Sheets-Sheet 1

Fig.1

INVENTOR
Ulysess G.Todd
BY
Cumpston & Griffith
his ATTORNEYS

March 29, 1932.  U. G. TODD  1,851,266

METHOD FOR TREATING SUBSTANCES

Filed Aug. 6, 1928   6 Sheets-Sheet 4

INVENTOR
Ulysess G. Todd
BY
his ATTORNEYS

March 29, 1932.  U. G. TODD  1,851,266
METHOD FOR TREATING SUBSTANCES
Filed Aug. 6, 1928  6 Sheets-Sheet 5

INVENTOR
Ulysess G. Todd
BY
his ATTORNEYS

Patented Mar. 29, 1932

1,851,266

UNITED STATES PATENT OFFICE

ULYSESS G. TODD, OF ROCHESTER, NEW YORK, ASSIGNOR TO THE PFAUDLER CO., OF ROCHESTER, NEW YORK, A CORPORATION OF NEW YORK

METHOD FOR TREATING SUBSTANCES

Application filed August 6, 1928. Serial No. 297,643.

This invention relates to a method for treating substances as, for example, the treatment of fruit juices for the production of beverages therefrom, and to an apparatus for carrying out the method efficiently and satisfactorily.

The method deals in part, with the thorough incorporation of one fluid in another fluid. The fluid in which the other fluid is incorporated is usually, though not necessarily, a liquid, while the fluid which is incorporated therein is usually, though not necessarily, a gas or vapor. This gas or vapor may be of any kind, either condensable or non-condensable, or partially condensable and partially non-condensable.

An object of the present invention is to provide a method by which the one fluid may be thoroughly mixed with and substantially completely incorporated in the other; and to provide efficient and satisfactory apparatus for carrying out this method.

Another object is to provide a more practical and efficient method and apparatus for the concentration of fluids, such for example as fruit juice, without loss of the flavoring and other volatile ingredients of the same, by removing such ingredients, concentrating the fluid, and reincorporating the ingredients in the concentrated fluid.

Still another object of the present invention is to provide an efficient and satisfactory method and apparatus which may be used, for example, for the recovery of esters, ethers, chloroform, alcohol, aromas, flavoring substances, or any other vaporizable and/or volatile constituents of various substances, and for the mixture or incorporation of such constituents with or in any desired fluid.

A further object resides in the provision of apparatus for carrying out quickly and efficiently the various steps abovementioned. A further object is the provision of such apparatus which is simple and compact, and which consists of but few parts. A still further object is to provide apparatus so arranged that a single receptacle or container may be used for the removal of a plurality of constituents or ingredients from a material, the ingredients being removed separately without danger of undesired mixture with each other.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The novel method of treatment forming part of this invention is applicable to the recovery of various vaporizable and/or volatile constituents or ingredients, such as esters, ethers, chloroform, alcohol, aromas, and flavoring substances of various kinds, from various materials, and also to the mixture or incorporation of such ingredients in any desired fluid.

According to the present method, the material or substance from which the vaporizable and/or volatile ingredients are to be removed is heated or otherwise treated in such way as to liberate or free the desired ingredient or ingredients, which are then removed from the container holding the material and are mixed with or incorporated in any suitable fluid. Either before or after the desired vaporizable ingredients are extracted from the material, this material may be subjected to treatment to extract other ingredients therefrom, which other ingredients may or may not also be of a vaporizable character. The treatments are preferably so carried out that the ingredient or ingredients extracted at one stage of the treatment are not appreciably mixed with the ingredient or ingredients extracted at another stage. Thus the desired vaporizable constituents which are removed for incorporation in a fluid, as mentioned above, are not mixed to any appreciable extent with other constituents which it is not desired to incorporate in the same fluid.

The desired vaporizable ingredient or ingredients, removed from the treated material in the form of a gas, are thoroughly mixed with and incorporated in any desired fluid, this incorporation preferably being produced in part by the introduction of the vaporizable ingredients into a flowing stream of the fluid in which it is to be incorporated. This fluid in which the vaporizable ingredient is incorporated may be, and usually is, a liquid. Preferably this liquid is circulated repeatedly past a point to which the vaporizable ingredient is supplied, so that it takes up some of this ingredient on each passage, and preferably also the stream of flowing liquid provides the means for withdrawing the vaporizable ingredient from the container in which it is liberated and transferring it to the point where it is mixed with the liquid.

A more thorough incorporation of the vaporizable constituent into the fluid with which it is mixed is preferably accomplished by circulating any unmixed vaporizable ingredient repeatedly through the fluid until it is all dissolved therein or mixed therewith. Preferably the vaporizable ingredient is cooled during this repeated circulation, and preferably also the fluid in which it is incorporated may be cooled during its circulation. Good results are obtained by the use of what might be termed a duplex circulation, the vaporizable ingredient being circulated through the fluid in which it is to be incorporated, and this fluid likewise being circulated through the vaporizable ingredient, both the ingredient and the fluid being cooled during the circulation. When the treatment is carried out according to this method, it is found that the vaporizable ingredient may be incorporated satisfactorily in the fluid in a comparatively short time, the results being much superior to those obtained by other methods heretofore known.

The fluid in which the vaporizable ingredient is incorporated preferably, but not necessarily, bears some relation to the material or substance from which the vaporizable ingredient is liberated or extracted. For example, this fluid may be the residue remaining after subjecting the material or substance to further treatments after the desired vaporizable ingredient has been removed therefrom, or it may be a product removed from this material or substance either prior to or subsequent to the extraction of the desired vaporizable ingredient.

To aid in the better understanding of the invention, the novel method will be described in detail with reference to the treatment of fruit juice, it being understood clearly that this material is mentioned only by way of example as a convenient substance in connection with which to describe the method. The method is equally applicable, however, to other substances having vaporizable constituents.

Assuming that fruit juice, for example orange juice, is to be treated, the untreated juice may be placed in a suitable container. Heat may then be applied thereto in sufficient quantity to liberate and drive off the esters, ethers, aromas, and other vaporizable and/or volatile constituents which go to make up the flavor and odor of the orange juice. These constituents may be removed from the container and transferred to another point for incorporation in any suitable fluid, which fluid preferably comprises orange juice which has been concentrated or otherwise treated.

After the removal of these vaporizable constituents from the orange juice, the juice is preferably subjected to further treatment while in the same container, this further treatment being carried out in such a manner that the products thereof are not mixed with the vaporizable ingredients previously removed. This treatment may comprise the application of heat to the orange juice to drive off part or all of the water therefrom, thus concentrating it. The concentrated orange juice may then be transferred to another receptacle and may be used as the fluid in which are incorporated the esters, ethers, aromas, and other desirable vaporizable constituents liberated or extracted from another quantity or batch of orange juice.

This concentrated orange juice may be circulated repeatedly and cooled during its circulation. Preferably the circulating stream of juice comprises the means for transferring the volatile ingredients out of the container in which they are liberated and drawing them toward and into this stream. The vaporizable ingredients are introduced into the flowing stream of concentrated orange juice and are partly condensed thereby and mixed with the juice. Those portions of the ingredients which do not become incorporated in the orange juice in this manner rise to the surface of the liquid in the receptacle into which the stream of mixed juice and gas is discharged, this stream preferably passing through the gas or vapor in the receptacle, to assist in the further incorporation of the gas in the orange juice.

In addition to the circulation of the fruit juice, the gas which rises to the surface of the juice in the receptacle is preferably also circulated so that it passes through the body of liquid, and it preferably is cooled and partially condensed during this circulation. The circulation of this gas through the liquid in this manner causes the gas to be thoroughly mixed with and dissolved in the liquid.

When treated in accordance with this method, orange juice may be concentrated and reduced in bulk without losing any substantial part of its aroma or flavor. The finished orange juice contains substantially all of the esters and other constituents which go to make up the desirable taste and smell of the juice, and thus a product of high quality is obtained.

The method of the present invention may be used for treatments of many other materials or substances in addition to fruit juice, which has been mentioned merely by way of example. For instance, the invention may be used in treating beer, wines, or other alcoholic beverages to reduce the alcoholic content thereof to the point required by various statutes. The esters, aromas, and other vaporizable constituents which are mainly responsible for the desirable taste and smell of the liquor may be removed therefrom in the manner above set forth with reference to orange juice; the liquor may then be concentrated to remove any desired part of the alcohol therefrom; and the concentrated liquor may then have the esters and other desirable ingredients introduced thereinto and incorporated therein. The method of the present invention may also be used for the production of perfumes, colognes, and any other substances which comprise in part vaporizable and/or volatile constituents or ingredients. It may also be used for the recovery of esters, ethers, chloroform, alcohol, or any other vaporizable materials or solvents which have been used in any other treatment or process.

The term "vaporizable" as used in this specification and in the claims is intended in its broadest sense, and includes not only those substances which may be transformed into a gaseous state from a liquid or a solid state, but also those substances which may exist normally in a gaseous state, either by themselves or mixed with or dissolved in fluids or solids. The term "fluid" is used throughout the specification and claims in its technical or scientific sense, meaning either gas or liquid, or both, and it is not to be construed as limited to a liquid, as is sometimes done in loose popular usage.

Figure 1:
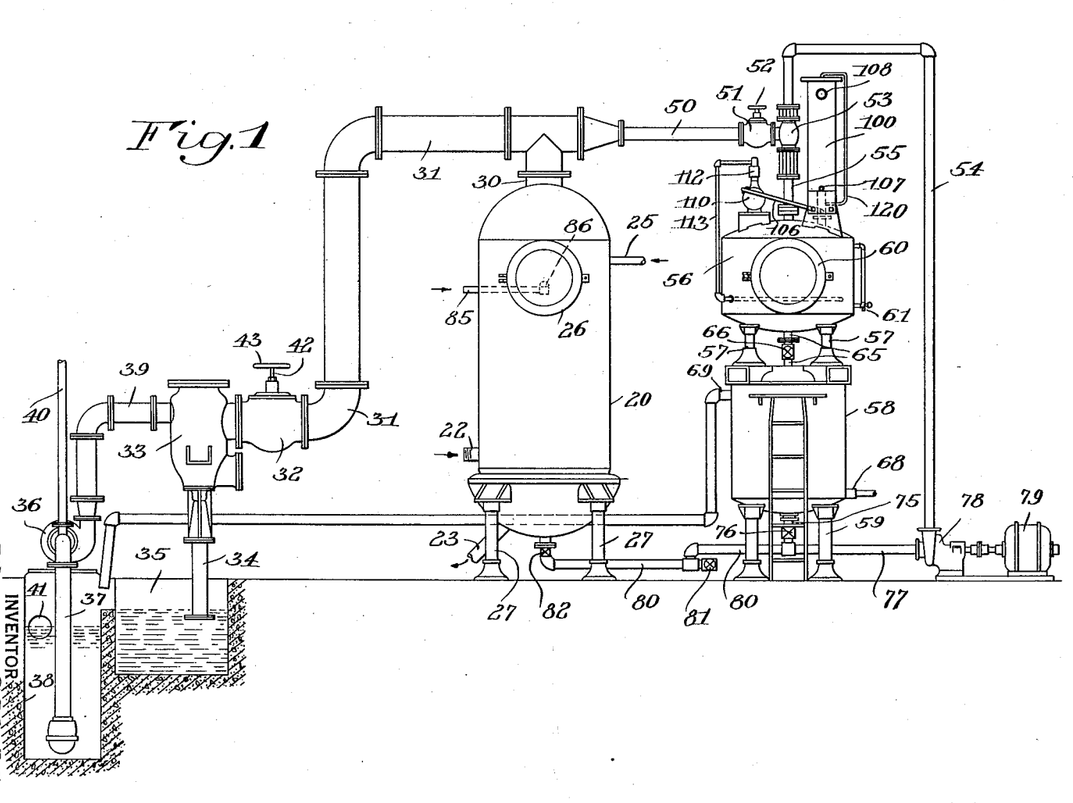
Fig. 1 is a side elevation of a preferred embodiment of apparatus for carrying out the novel method.
Figure 2:
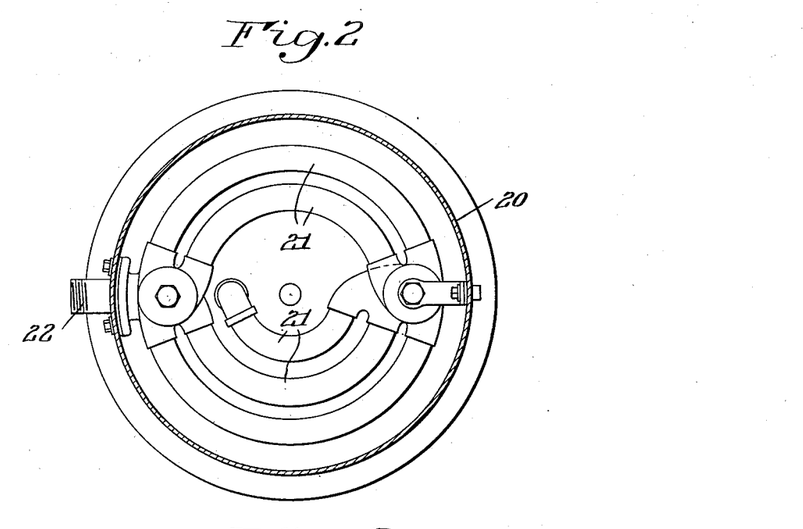
Fig. 2 is a horizontal section through a liquid container used in the apparatus, showing heating coils therein.
Figure 3:
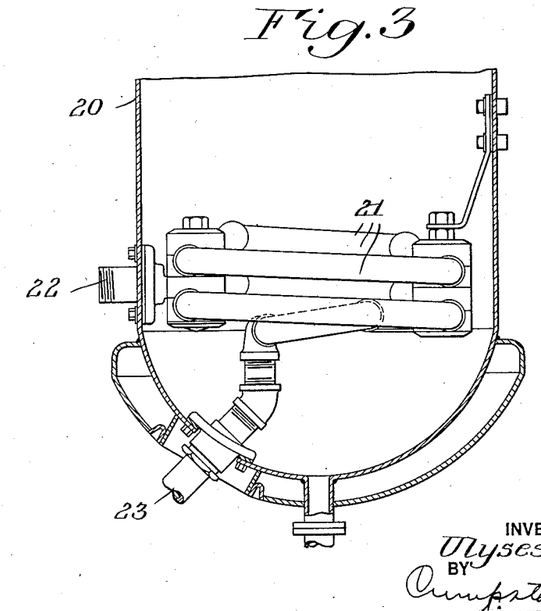
Fig. 3 is a vertical section taken centrally through the lower part of the same container shown in Fig. 2, with the heating coils in elevation.

A preferred embodiment of an apparatus for carrying out the method of this invention will now be described with reference to the accompaying drawings. In Fig. 1 there is shown a container 20 provided with any suitable means for applying heat to the material within it. This means may include the coil pipes 21 illustrated in Figs. 2 and 3, the coils being connected to an inlet 22 and an outlet 23. Steam or hot water or any other desired fluid may be circulated through the coil in order to heat the interior of the container 20. The container may be provided with any suitable means for introducing material into it, such as the conduit 25 through which a fluid material may be introduced, and the door 26 through which a solid material may be introduced, this door also serving as a manhole for obtaining access to the interior of the container. This container may be supported in any suitable way such as by the legs 27 which rest upon a floor.

A comparatively large conduit 30 extends upwardly from the top of the container 20, as shown clearly in Fig. 1, and has a branch 31 leading leftwardly therefrom, this branch passing through a balanced check valve 32 and leading to an eductor 33 which is arranged to discharge through a conduit 34 into a liquid receptacle 35. The eductor 33 is supplied with any suitable operating fluid, such as water, by a pump 36, which draws the water through a suction pipe 37 from a sump 38 and discharges it through a conduit 39 leading to the eductor 33. It will be understood that the liquid supplied to the eductor 33 through the conduit 39 creates a suction or partial vacuum in the conduit 31 which extends from the container 20 to this eductor. The liquid discharged from the eductor flows out through the pipe 34 into the well 35, and thence overflows into the sump 38 from which it may be drawn up by the suction conduit 37 of the pump 36 and circulated again through the eductor. Thus the same liquid may be used over and over again for operating the eductor 33, although fresh liquid may be supplied when desired through the supply pipe 40, and an overflow opening 41 may be provided in a wall of the sump 38.

The check valve 32 is arranged to open when the pressure to the right of the valve (when viewed as in Fig. 1) is greater than the pressure to the left of the valve, and to close when the pressure to the left of the valve is greater than that to the right. This valve is provided with a valve stem 42 controlled by a hand wheel 43, which valve stem may be screwed down to limit the extent of opening of the valve to any desired amount, or to keep the valve completely closed, if desired, notwithstanding higher pressure on the right hand side than on the left hand side.

Leading rightwardly from the conduit 30 at the top of the container 20 is a somewhat smaller conduit 50 in which is placed a balanced check valve 51 arranged to open when the pressure to the left of the valve is greater than that to the right thereof, and to close when the pressure conditions are reversed. This check valve, like the valve 32, is provided with a handle 52 by which the extent of opening of the valve may be regulated, and which may be used to keep the valve completely closed when desired.

Continuing beyond the check valve 51, the conduit 50 is connected to an eductor 53 which is operated by liquid supplied to it through a conduit 54. The eductor 53 discharges through a conduit 55 which leads into the top of a receptacle 56 supported by legs 57 which rest upon a cooler housing 58, which is in turn supported by legs 59 standing upon the floor. The receptacle 56 is provided with a door or manhole 60 through which access to the interior of the receptacle may be obtained, and it also has a testing cock 61 through which a part of the fluid within the receptacle may be withdrawn for testing purposes.

Figure 4:
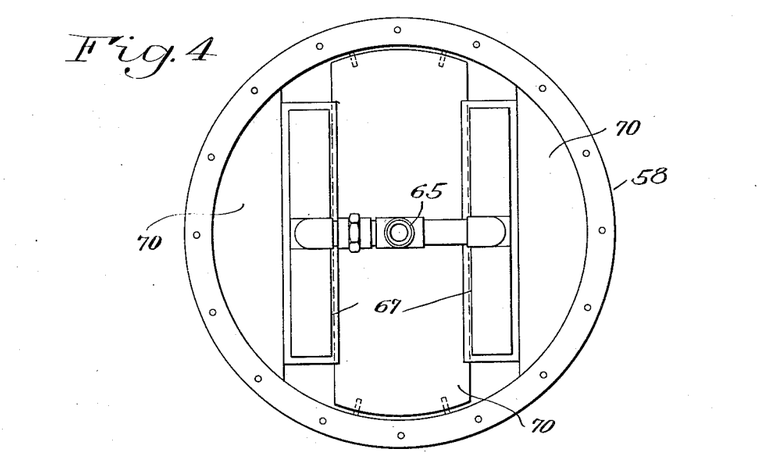
Fig. 4 is a plan of a cooler used in the apparatus.
Figure 5:
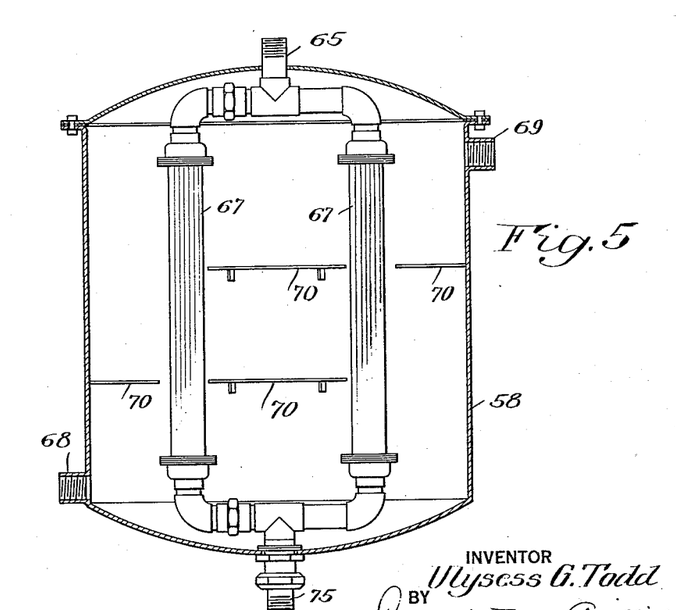
Fig. 5 is a view partly in vertical section and partly in elevation of the cooler shown in Fig. 4.

A conduit 65 having a valve 66 therein leads from the bottom of the receptacle 56 to the cooler within the housing 58. This housing contains a plurality of cooling units 67 arranged in parallel or multiple, as is best shown in Figs. 4 and 5. Each of these units 67 comprises a comparatively large number of cooling tubes through which the fluid to be cooled may pass, while any suitable cooling medium, such as brine, may be circulated within the casing 58 around these tubes. The cooling medium may be supplied to the housing 58 through a conduit connected to the opening 68, and may be discharged therefrom through a conduit leading from the opening 69, this conduit being shown in Fig. 1 as leading to the sump 38. The cooler casing 58 is provided with baffle walls 70 (Fig. 5) which force the cooling medium to travel back and forth in a circuitous path so that it circulates around all of the cooling tubes in the cooling units 67.

The fluid flowing down from the receptacle 56 through the conduit 65 and through the cooling units 67 is discharged through a conduit 75 at the bottom of the cooler, this conduit having a control valve 76 therein. Below this valve 76 (see Fig. 1) the conduit has a rightwardly extending branch 77 which leads to the suction side of a pump 78 driven by the motor 79. The delivery side of the pump is connected to the conduit 54, above mentioned, which leads to the eductor 53.

Below the valve 76 the conduit 75 also has a branch which extends leftwardly or in the opposite direction from the branch 77, this leftward branch being designated as 80 in Fig. 1. At one point it is provided with an opening controlled by a valve 81, so arranged that a hose or other conduit may be connected to the valve 81 and this valve may be opened when it is desired to withdraw fluid from or introduce fluid into the conduit 80. Extending leftwardly from this inlet or outlet valve 81, the conduit 80 continues to a point beneath the container 20, where it is provided with a control valve 82 and is connected to the bottom of the container.

From the apparatus so far described, it will be apparent that, if a supply of liquid is placed within the receptacle 56, the pump 78 may be operated to draw this liquid down through the cooler, force it up through the conduit 54 and through the eductor 53, and back into the receptacle 56 through the conduit 55. The passage of the liquid through the eductor 53 will create a suction or partial vacuum in the conduit 50 which leads to the eductor.

If a material having a vaporizable constituent or ingredient be placed within the container 20 and be heated to the proper extent, it is apparent that vapor or gas will be formed within this container. If desired, the formation of the gas may be somewhat aided by supplying steam through a conduit 85 to a spray device 86 within the container 20, the spray of steam being directed upwardly or toward the discharge conduit 30 of the container. The gas or vapor formed within the container 20 will be drawn along through the conduit 50 on account of the suction created by the eductor 53, and this gas will be mixed with the fluid flowing through the eductor and will pass with this fluid through the conduit 55 into the receptacle 56. When the gas from the container 20 is thus supplied to and introduced into a stream of flowing fluid, it becomes well mixed therewith and is incorporated in the flowing fluid. Because the fluid flowing through the eductor circuit is considerably cooler than the gas coming from the heated receptacle 20, a considerable part of this gas will be condensed when it comes into contact with the fluid flowing through the eductor, and a large part of the gas which is not thus condensed will become dissolved in or absorbed by the fluid.

Preferably the fluid flowing through the conduit 54 and eductor 53 is a liquid. In order to aid the gas coming through the conduit 50 to become thoroughly mixed with the liquid, the stream of mixed liquid and gas flowing from the conduit 55 into the receptacle 56 may discharge into a supplementary receptacle or eductor seal, instead of discharging directly into the body of liquid within the receptacle 56.

Figure 11:
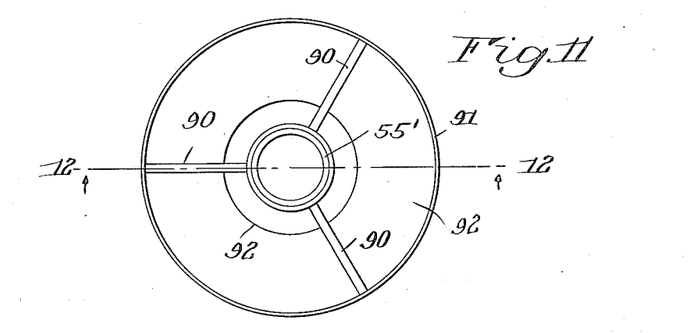
Fig. 11 is a plan of a supplementary receptacle or eductor seal used in the apparatus.
Figure 12:
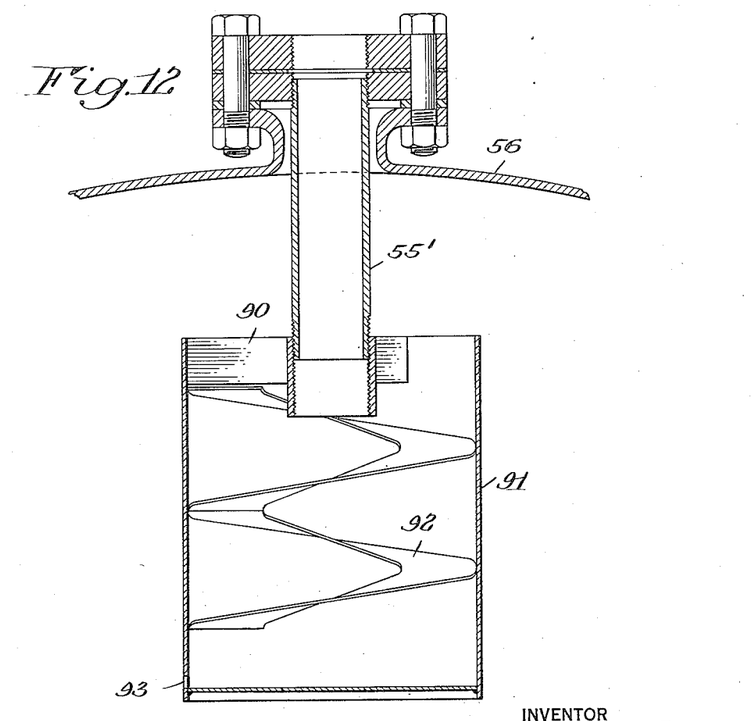
Fig. 12 is a central vertical section taken approximately on the line 12—12 of Fig. 11.

This supplementary receptacle or eductor seal is of the construction best shown in Figs. 11 and 12. Referring now to these figures, the conduit 55 has an extension 55' extending a slight distance down into the receptacle 56, and secured to a collar screwed on to the lower end of this extension 55' is a spider comprising arms 90, three of these arms being illustrated in Fig. 11. This spider supports a supplementary receptacle 91 which may be in the form of a cylinder having an open top. The stream of mixed liquid and gas flowing downwardly through the conduit 55' passes into this supplementary receptacle or eductor seal 91 and overflows therefrom into the main body of liquid within the receptacle 56. The mixture of liquid and gas within the container 91 is being constantly agitated by the liquid flowing in through the conduit 55', and this stirring up action aids the incorporation of the gas into the liquid. Furthermore, baffle means such as the spiral strip 92 may be provided within the receptacle 91 to impede the rapid rise of gas bubbles through the liquid within the receptacle, thus holding the gas in the liquid for a longer time and giving it a greater chance to become dissolved in the liquid. The gas bubbles normally tend to rise along the sides of the supplementary receptacles 91, and as the baffle means 92 extends spirally around the sides of the receptacle, it is in the path of these rising bubbles.

A comparatively small opening 93 may be provided at the bottom of the receptacle 91 so that when the flow of liquid through the conduit 55' is shut off, the liquid within the supplementary receptacle 91 may drain out.

While the apparatus so far described gives good results in incorporating gas from the container 20 into the fluid within the receptacle 56, still better results are obtained by the us of means for producing a circulation through the liquid of any gas which has not become incorporated therein by this mechanism previously described. This gas circulating means is best shown in Figs. 6 to 10 inclusive, and will now be described with reference to these figures.

Figure 10:
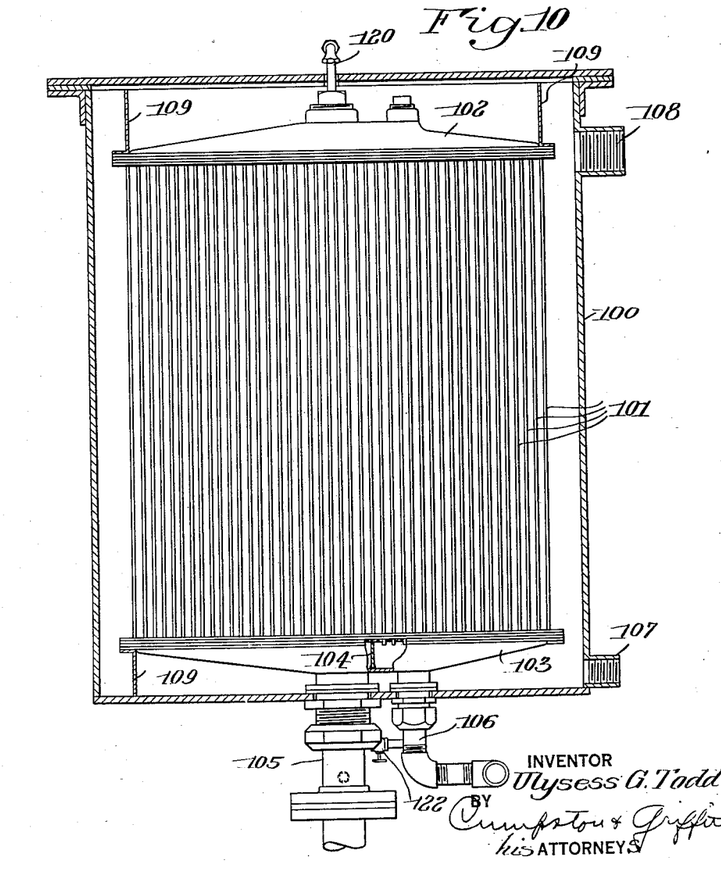
Fig. 10 is a vertical sectional view through the cooler or condenser shown in Fig. 9.

Mounted upon the top of the receptacle 56 is a cooler housing 100 containing a cooling unit comprising a series of small tubes 101 extending between an upper header 102 and a lower header 103, as shown in Fig. 10. The lower header 103 is divided by a partition 104 into two compartments, while the upper header is not divided. An inlet conduit 105 is connected to the lower header 103 on one side of the partition 104, while an outlet conduit 106 leads from the header at the other side of the partition. Hence, fluid introduced into the cooling unit through the conduit 105 will flow upwardly through those of the tubes 101 which are on one side of the partition 104, passing thence into the upper header 102 and flowing down from this header through the tubes which are on the other side of the partition 104, then passing out through the conduit 106. Any suitable cooling medium such as brine, may be introduced into the cooler casing 100 through an opening 107 and withdrawn therefrom through an opening 108.

Baffle walls 109 are provided within the casing to direct the course of the cooling medium so that it passes around and between the various tubes 101. In this way, the fluid flowing through the tubes is cooled.

Figures 6, 7, 8:
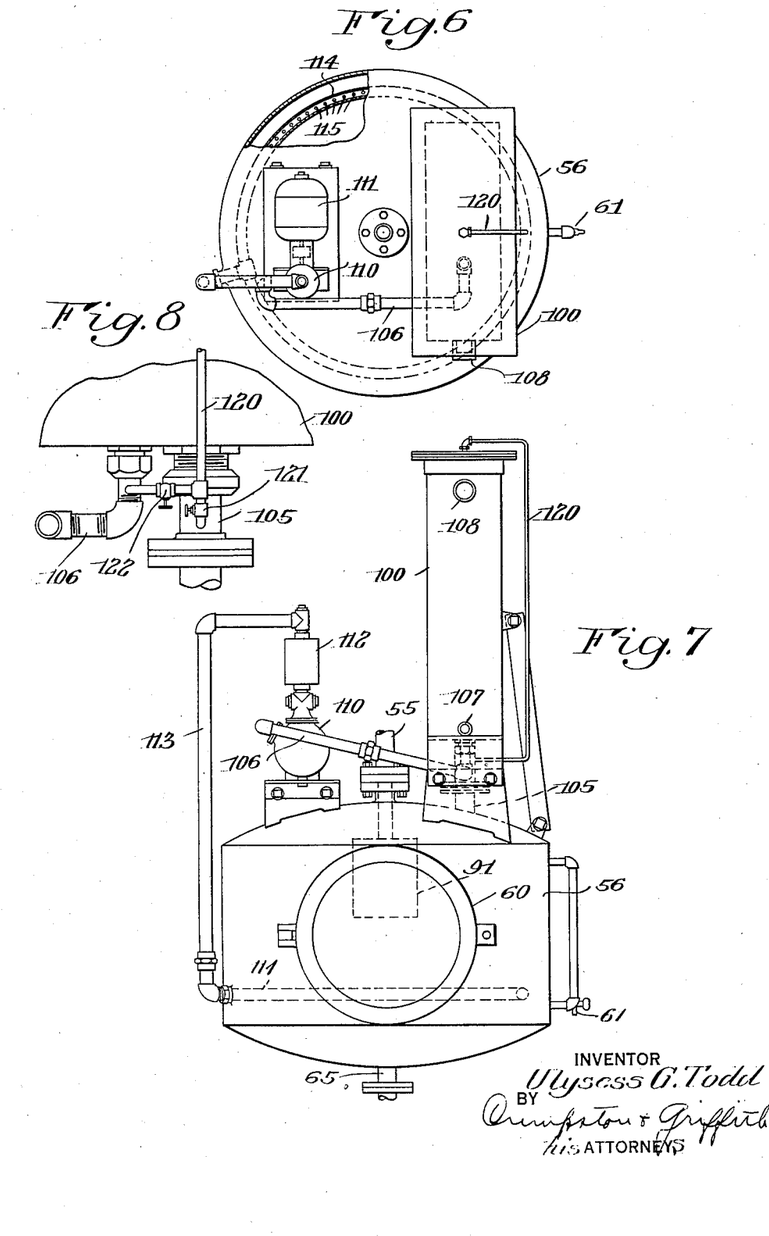
Fig. 6 is a plan of a liquid receptacle and other parts of the apparatus, with part of the receptacle broken away to show the construction therein.
Fig. 7 is an elevation of the parts shown in Fig. 6.
Fig. 8 is a fragmentary elevation of a part of the apparatus shown in Figs. 6 and 7, illustrating the connections of a by-pass.

The inlet conduit 105 leads to the cooling unit from the top of the receptacle 56, as shown in Fig. 7. The outlet conduit 106 extends to a pump 110 driven by a motor 111 (Fig. 6), this pump being capable of handling both liquids and gases. Above the pump, on the discharge side thereof, is a chamber 112 forming a pump seal, and from this chamber the conduit 113 extends downwardly to a point near the bottom of the receptacle 56, where it passes through a wall of the receptacle and is connected to a ring-shaped pipe 114 having a plurality of openings 115 in the bottom thereof, as shown in Fig. 6. This annular conduit 114 is below the normal liquid level within the receptacle 56.

Any gas not incorporated in the liquid within the receptacle 56 arises to the top of the liquid therein and occupies the space between the surface of the liquid and the top of the receptacle. Operation of the pump 110 draws this gas out of the receptacle 56 through the conduit 105, passing it through the cooling tubes 101, in which a part of the gas is condensed. Part of the condensate may drip back into the receptacle through the conduit 105, while the mixture of gas and the rest of the condensate is then forced by the pump 110 through the conduit 113 and into the perforated conduit 114 within the receptacle 56. The gas and condensate then pass out of the conduit 114 through the openings 115 in the bottom thereof, the condensate mixing with the liquid in the receptacle 56 and the gas becoming largely or entirely dissolved in the liquid. Any gas which does not become dissolved in or absorbed by the liquid in this manner bubbles up through the liquid and rises again to the space above the liquid, from which it may be again drawn by the pump 110 and recirculated in the manner above described, this circulation of the gas through the liquid being continued as long as may be necessary in order to accomplish satisfactory incorporation of all of the gas or any desired proportion thereof in the liquid.

Figure 9:
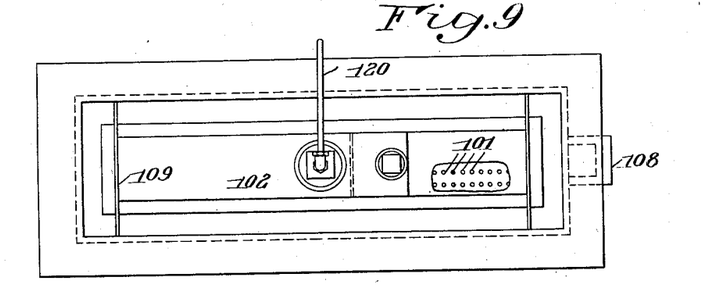
Fig. 9 is a plan of a cooler or condenser shown in Figs. 6 and 7.

Usually the gas which is to be incorporated in the liquid is at least partially condensable. As the tubes 101 of the cooler may become partially filled with condensate formed from the gas, this condensate may at times impede the flow of gas through the cooler. To avoid this, a by-pass may be provided, this by-pass comprising a conduit 120 connected at one end to the upper header 102, as shown in Figures 7, 8 and 9, and having branches at its lower end leading to the inlet conduit 105 and the outlet conduit 106. The branch leading to the former may be controlled by a valve 121, while that leading to the latter may have a valve 122 placed therein. Either of these valves may be opened in order to equalize the pressure in the two headers 102 and 103, so that the condensate within the tubes of the cooler may flow through these tubes and out through the conduits 105 and 106. It will be noted that the by-pass 120 extends outside of the cooler casing 100.

The operation of the apparatus will now be described, using orange juice for the sake of illustration, although it is to be understood that the apparatus is in no way limited to the treatment of this material. Natural orange juice may be introduced into the container 20 through the conduit 25, it being understood that the valves 82 and 81 are closed. A supply of concentrated orange juice is placed within the receptacle 56.

Heating fluid is supplied to the heating coils 21 through the inlet 22, so that the orange juice within the container 20 becomes heated. While this heating is going on, the eductor 33 may be operated by the pump 36 to produce a vacuum in the container 20. Since the eductor 33 is larger and of greater capacity than the eductor 53, the former can exhaust the container more rapidly than the latter, and in this way time can be saved.

When the container has been exhausted to the desired degree and when the orange juice therein has been heated to the point where the esters, aromas, and various volatile ingredients thereof begin to come off, the eductor 33 may be shut down and the pump 78 may be started to operate the eductor 53. When this pump 78 is placed in operation, it draws the concentrated fruit juice in the receptacle 56 down through the cooler 58, thus reducing the temperature of the juice, and forces it through the eductor 53 to create a suction in the conduit 50, which suction draws the esters, aromas and volatile constituents from the container 20 and mixes them with the stream of concentrated orange juice passing through the eductor 53. The liberation of these esters, aromas and volatile ingredients and the transfer thereof from the container 20 to the conduit 50 may be assisted, if desired, by the introduction of steam through the conduit 85 to the spray device 86.

These esters, aromas, and volatile ingredients are mixed with the concentrated juice flowing through the eductor 53 and pass with this juice into the eductor seal or supplementary receptacle 91, where the absorption of the gas by the liquid is aided. The liquid overflows from this supplementary receptacle 91 and falls to the main body of liquid in the receptacle 56, passing through the body of gas which gradually forms in the upper part of the receptacle above the level of the liquid therein. Further absorption or dissolving of the gas in the liquid occurs during this flow of liquid through the gas, and also occurs at the surface of the liquid in contact with the gas.

Other gas which accumulates above the main body of liquid is circulated by operation of the pump 110 so that it passes through the cooler tubes 101 and is partially condensed thereby, thence being forced into the body of liquid through the opening 115 in the ring-shaped conduit 114. This duplex circulation of gas through liquid and liquid through gas is continued until the desired amount of vaporizable ingredients has been drawn over or extracted from the fruit juice in the container 20. When substantially all or any desired part of the ingredients which go to make up the flavor and aroma of the fruit juice has been extracted from it, the eductor 53 may be shut down by stopping the pump 78, although the operation of the pump 110 may be continued for a time if desired, in order to complete the incorporation into the concentrated orange juice of any gas which still remains within the receptacle 56.

The pump 36 is then started to operate the eductor 33, and the fruit juice within the container 20 is further heated to the desired point to drive off any desired quantity of water or other vaporizable ingredient. The water or other constituents thus vaporized are drawn off by the suction of the eductor 33. While this concentration of the fruit juice is going on, the liquid in the receptacle 56 may be drawn off in any suitable manner, such as by draining it out through the valve 81. This liquid consists of concentrated orange juice which has substantially all the flavor and aroma of the natural orange juice, since the ingredients which cause this flavor and aroma have been reincorporated in the juice subsequent to its concentration.

When the finished orange juice has been withdrawn from the receptacle 56, and when the concentration of the juice within the container 20 has been completed, the concentrated juice may then be transferred from the container 20 to the receptacle 56. This transfer may be accomplished, for example, by opening the valve 82 and closing the valve 76, and operating the pump 78 to draw the liquid from the container 20 through the conduits 80 and 77 and force it into the receptacle 56 by way of the conduit 54.

The valve 82 may then be closed, the valve 76 opened, and a fresh supply of natural orange juice may be placed in the container 20. The eductor 33 is then operated to build up a vacuum in the container quickly, while the orange juice is being heated, operation of this eductor resulting in automatic closing of the check valve 51. Then the eductor 33 is shut down and the eductor 53 is started, which opens the check valve 51 and closes the check valve 32.

Operation of the eductor 53 draws the aromas and esters from the juice within the container 20 into the concentrated juice in the receptacle 56, thus restoring the concentrated juice substantially to its original natural flavor and odor. The cycle of operation may be repeated as long as desired.

Although the operation of the apparatus has been described in connection with orange juice, it will be understood that it may be used equaly well for various treatments of various other materials. The container 20 is adapted to be used for the extraction of a plurality of vaporizable ingredients from any material when it is desired to keep the ingredients separate from each other. The eductor 53 may be used during the extraction of one ingredient, while the other eductor 33 may be used during the extraction of the other ingredient. The constituent or ingredient which is extracted during the operation of the eductor 53 may be mixed with or incorporated in any desired fluid, which may be used to operate the eductor. This fluid used for operating the eductor 53 may be the product of a previous cycle of treatment within the container 20, as in the case of the orange juice mentioned above, or it may comprise a totally different substance bearing no relation to the material within the container 20.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. The method of incorporating a gas in a liquid which comprises bringing a gas and a liquid into contact with each other in a receptacle and creating a duplex circulation by circulating a portion of the liquid through the gas and concomitantly circulating a portion of the gas through the liquid.

2. The method of incorporating a gas in a liquid which comprises bringing a gas and a liquid into contact with each other in a receptacle, withdrawing a portion of the liquid from the receptacle, cooling the withdrawn liquid, circulating the cooled liquid through the gas within the receptacle, and concomitantly withdrawing a portion of the gas from the receptacle, cooling the withdrawn gas, and circulating the cooled gas through the liquid within the receptacle.

ULYSESS G. TODD.